(12) United States Patent
Fan et al.

(10) Patent No.: US 10,923,926 B2
(45) Date of Patent: Feb. 16, 2021

(54) CONNECTOR-BASED HIGH-VOLTAGE LOCKOUT FUNCTION

(71) Applicant: GM Global Technology Operations LLC, Detroit, MI (US)

(72) Inventors: Yue Fan, Ann Arbor, MI (US); Konking Wang, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 198 days.

(21) Appl. No.: 16/057,051

(22) Filed: Aug. 7, 2018

(65) Prior Publication Data

US 2020/0052509 A1    Feb. 13, 2020

(51) Int. Cl.
  *H02J 7/00* (2006.01)
  *H01R 31/08* (2006.01)
  *H02P 27/06* (2006.01)
  *B60L 50/51* (2019.01)

(52) U.S. Cl.
  CPC ............ *H02J 7/0029* (2013.01); *B60L 50/51* (2019.02); *H01R 31/08* (2013.01); *H02J 7/0063* (2013.01); *H02P 27/06* (2013.01); *B60L 2210/40* (2013.01)

(58) Field of Classification Search
  CPC ....... H02J 7/0029; H02J 7/0063; B60L 50/51; B60L 2210/40; H01R 31/08; H02P 27/06
  USPC .................................................. 307/9.1, 10.1
  See application file for complete search history.

(56) References Cited

U.S. PATENT DOCUMENTS

2014/0062180 A1    3/2014    Demmerle et al.

*Primary Examiner* — Hal Kaplan
(74) *Attorney, Agent, or Firm* — Quinn IP Law

(57) ABSTRACT

An electrical system includes a high-voltage bus connected to a rechargeable energy storage system (RESS) and a high-voltage component connected to the RESS via the voltage bus. The component defines a service opening spanned by a removable cover. The electrical system may include a fastener connecting the cover to the component, as well as a battery disconnect unit (BDU) having a high-voltage switch device connecting the RESS to the high-voltage bus. The switch device closes responsive to a low-voltage drive current to connect the RESS to the high-voltage bus. A drive circuit conducts the current to the switch device. An electrical connector has multiple connector pieces collectively forming a switch in the drive circuit. Disconnection of the pieces from each other opens the switch to interrupt the drive current and cause the high-voltage switch device to open, which disconnects the RESS from the high-voltage bus.

18 Claims, 3 Drawing Sheets

CONNECTOR-BASED HIGH-VOLTAGE LOCKOUT FUNCTION

INTRODUCTION

An electrified vehicle powertrain, power plant, or other high-voltage system may include an electrical system having separate high-voltage and low-voltage buses. While "high-voltage" and "low-voltage" are relative terms, "low-voltage" often encompasses a maximum voltage level of 12-15 volts, i.e., an auxiliary voltage, with the term "high-voltage" describing voltage levels well above auxiliary voltage levels. An electrified vehicle propulsion system, for instance, may have a maximum bus voltage of 60-300 volts, with certain emerging battery packs having a voltage capacity of 500-800 volts.

Regardless of nominal voltage levels, the high-voltage and low-voltage buses of a dual-bus electrical system are respectively connected to a high-voltage rechargeable energy storage system (RESS), e.g., a lithium ion or nickel metal hydride battery pack and associated power electronics, and a lead-acid or other application-suitable auxiliary battery pack. On the high-voltage bus, strategically-positioned high-current fuses and high-voltage switches help ensure voltage isolation in the event of a fault condition, with the switches also opened during routine shut down procedures. Fuses are replaceable circuit elements that permanently default to open circuit state in response to a threshold battery pack current. Therefore, maintenance efforts may involve accessing a high-voltage component for fuse replacement.

Additionally, some electrical systems use a software-based process known as "high-voltage interlock" (HVIL) to monitor the high-voltage bus for an attempted access, such as attempted maintenance of a high-voltage electrical component. In general, the HVIL process involves closely monitoring a low-voltage HVIL circuit for electrical continuity. A low-voltage controller commands one or more high-voltage switch devices located within the RESS to open in response to detection of a circuit discontinuity. Other approaches for reducing the risk of high-voltage exposure in a dual-bus electrical system include the use of a manual service disconnect (MSD), i.e., a large battery pack fuse that is manually removable by service personnel prior to accessing the high-voltage bus. The physical removal of an MSD intrudes very high resistance into the high-voltage bus circuit to effectively break the RESS into multiple lower-voltage battery sections, thereby reducing the maximum voltage presented on the high-voltage bus.

SUMMARY

An electrical system is disclosed herein that minimizes reliance on and possibly eliminates the above-noted manual service disconnect (MSD) and/or the high-voltage interlock (HVIL) monitoring process. While such approaches effectively reduce exposure to high-voltage power in an electrified powertrain, certain performance advantages may be enjoyed by eliminating pre-programmed HVIL control logic or the packaging space and mass associated with an MSD. Additionally, the internal fuse structure and external packaging configuration of the MSD tends to be highly application-specific. The disclosed approach is therefore intended to provide a simplified and robust connector-based alternative approached, referred to herein as a "high-voltage system lockout (HVSL)" topology, that may be extended across a wide range of electrical systems.

An electrical system according to an exemplary embodiment includes a rechargeable energy storage system (RESS), a high-voltage bus, a high-voltage component, and a battery disconnect unit (BDU) having one or more electrical high-voltage switch devices, e.g., contactors, solid-state/semiconductor switches, or other suitable switching configurations. The BDU is positioned between the RESS and one or both bus rails of the HV bus. The binary open/closed switching state of the high-voltage switch devices is determined by an energized state of the switch devices. A low-voltage drive current is conducted to the high-voltage switch devices via a low-voltage drive circuit to energize the switch devices. The energized switch devices close in response to the low-voltage drive current, with the closed state electrically connecting the RESS to the high-voltage bus and the rest of the electrical system. Likewise, the RESS is electrically disconnected from the electrical system when the high-voltage switch devices open.

The high-voltage switch devices of the BDU automatically open in response to an open-circuit condition of the drive circuit, such that the low-voltage drive current is physically broken or interrupted. While a controller-based switching signal may also command the high-voltage switch device(s) to open or close in some embodiments, interruption of the drive current alone will cause the RESS to be disconnected and the high-voltage bus to be deenergized. For instance, when the high-voltage switch devices are embodied as optional solenoid-driven devices, absent a generated solenoid field the contactors are unable to remain in the closed state, and consequently spring open when the solenoid field decays.

The high-voltage component defines a service opening that is spanned and closed by a removable cover when the cover is in an installed position. One or more fasteners may securely connect the cover to the high-voltage component in the installed position.

The electrical connector described herein has multiple connector pieces, i.e., at least two and possibly three or more pieces. The connector pieces, when assembled together, collectively form a low-voltage electrical switch within the drive circuit. Disconnection of the various connector pieces from each other opens the electrical switch, which in turn creates an open-circuit condition in the low-voltage drive circuit which causes the driven high-voltage switch devices to open. The electrical connector thereby performs a high-voltage system lockout (HVSL) function within the disclosed electrical system. Closing the high-voltage switch devices may require completion of a high-voltage lockout safety process, e.g., removal of a physical lockout device such as a padlock. As a result, simply reconnecting the electrical connector, by itself, is insufficient for reenergizing the high-voltage bus, with a control signal needed to close the high-voltage switch devices pursuant to such a lockout procedure, as will be appreciated by one of ordinary skill in the art.

When the electrical connector is connected to the high-voltage component, the electrical connector directly blocks access to the removable cover in some fashion. For example, the connector may overlap a perimeter edge of the cover. In some embodiments, fasteners are used to secure the cover to the high-voltage component. Removal of the connector in such an embodiment is needed in order to fully expose one or more of the fasteners and to thus enable a tool bit to be mated to a fastener head for removal of the cover.

The electrical connector may include a first connector piece configured to fixedly engage the high-voltage component, and second and third connector pieces that connect to each other and to the first connector piece to close the low-voltage drive circuit. At the same time, the coupled first, second, and third connector pieces may prevent or block access to and removal of the fastener(s) securing the cover.

The low-voltage drive circuit may be routed between the high-voltage switch devices and the second and third pieces of the electrical connector in some embodiments.

The high-voltage bus in an example embodiment has a minimum voltage level of 60 volts, while the low-voltage drive circuit in such an embodiment has a maximum voltage level of 12-15 volts, i.e., a low-voltage/auxiliary voltage.

Optionally, the perimeter edge of the cover may be rectangular in shape. Fasteners in such an embodiment may be positioned to secure a corresponding corner of the cover. The second and third connector pieces may block access to and thus prevent removal of the fastener(s), such as by overlapping at least one of the fasteners.

The high-voltage component may be an auxiliary power module (APM), i.e., a DC-DC converter, or an air conditioning control module (ACCM) in two non-limiting example embodiments.

The first connector piece may include one or more push-in clip fasteners to fixedly secure the first piece to the high-voltage component.

The low-voltage drive circuit may include a multi-conductor wire. The second or third connector piece may include a U-shaped shorting bar that closes the drive circuit across the multi-conductor wire when the second and third connector pieces are connected to each other.

The electrical system may include a controller, referred to herein as a battery system manager (BSM), and a polyphase electrical machine connected to the high-voltage bus via a power inverter module. The BSM may be optionally configured to automatically discharge the high-voltage bus via switching control of the electric machine responsive to opening of the high-voltage switch devices.

According to another example configuration in which the electrical connector has the above-noted first, second, and third connector pieces, the first connector piece has a mounting feature that fixedly engages the high-voltage component. The second connector piece is removably connectable to the first connector piece. The third connector piece is removably connectable to the first and second connector pieces. The first, second, and third connector pieces collectively form an electrical switch in the drive circuit, such that a disconnection of the connector pieces from each other opens the electrical switch and thereby causes the high-voltage switch devices to open.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
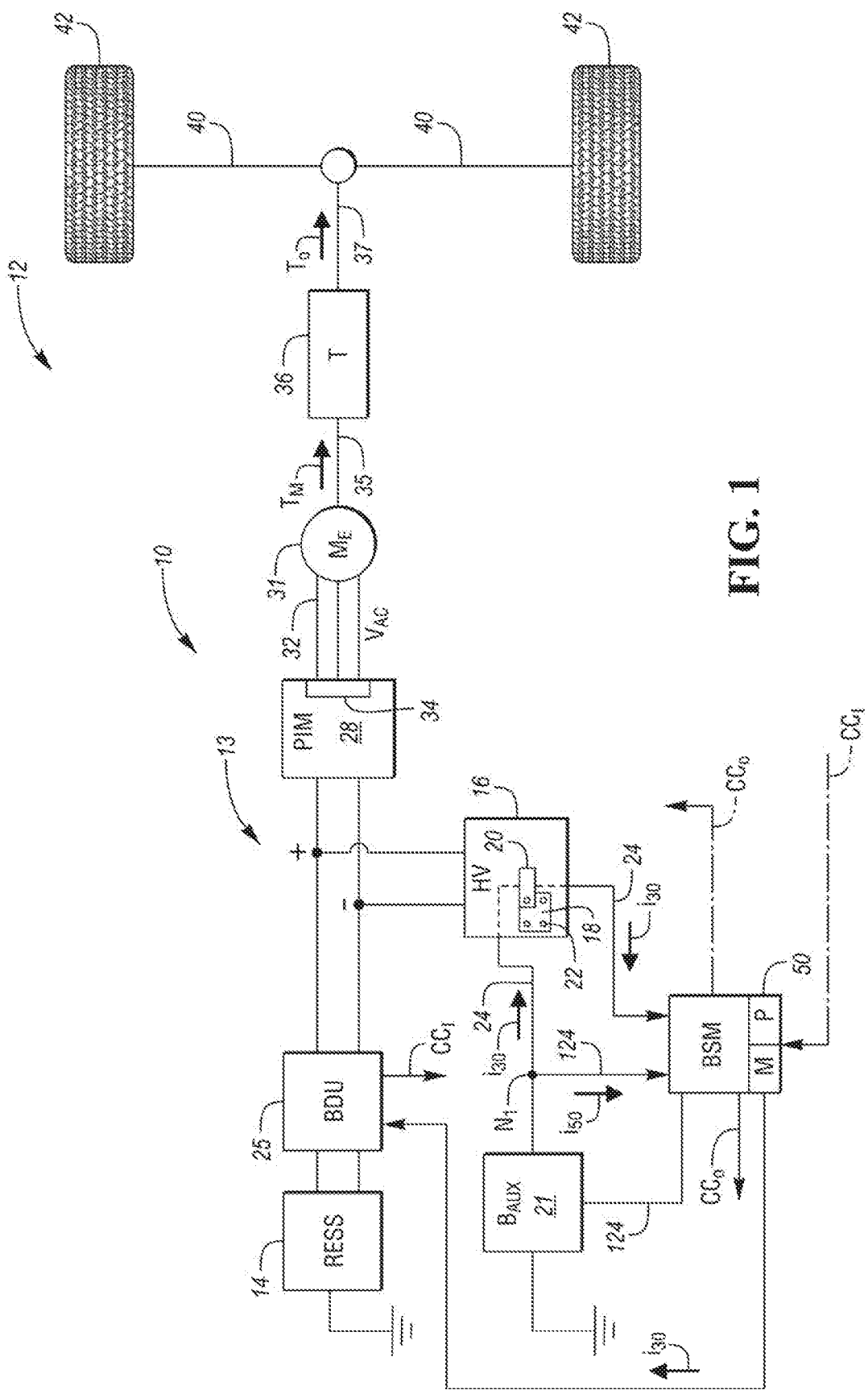
FIG. 1 is a schematic illustration of an example electrical system having a rechargeable energy storage system (RESS), high-voltage and low-voltage buses, a high-voltage component, and a multi-piece electrical connector providing a high-voltage lockout function as described herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to like components, an electrical system 10 is shown in FIG. 1. The electrical system 10, which may be used as part of an example vehicle 12 as described herein or as part of a power plant or other mobile or stationary device or system, provides a high-voltage system lockout (HVSL) function that may forego use of a manual service disconnect (MSD) and/or high-voltage interlock (HVIL) process as described above.

The electrical system 10 includes multiple voltage buses, including a high-voltage (HV) bus 13 that is connected to a rechargeable energy storage system (RESS) 14. The term "high-voltage" as used herein refers to voltage levels in excess of 12-15 volt low-voltage/auxiliary voltage levels, e.g., 60-300 volts or higher. Also as used herein, the term "RESS" refers to a multi-cell rechargeable battery pack having a lithium ion, nickel metal hydride, or other application-suitable battery chemistry, as well as associated power electronics required for proper control and thermal regulation of such a battery pack.

A high-voltage component 16 is electrically connected to the RESS 14 via the HV bus 13 and has a removable cover 18, such as a rectangular plate. As will be described in detail below with particular reference to FIGS. 2, 3, and 4, the high-voltage component 16 defines a service opening 19 that is spanned and sealed off by the cover 18 when the cover 18 is fastened to the high-voltage component 16 in an installed position. One or more fasteners 22 may be used to securely connect the cover 18 to the high-voltage component 16. Within the electrical circuit 10, a low-voltage drive current (arrows $i_{30}$) is conducted to and through an electrical connector 20 positioned adjacent to the cover 18, with a multi-piece construction of the electrical connector 20 forming an electrical switch in a low-voltage drive circuit 24 to serve the noted HVSL function.

Figure 2:
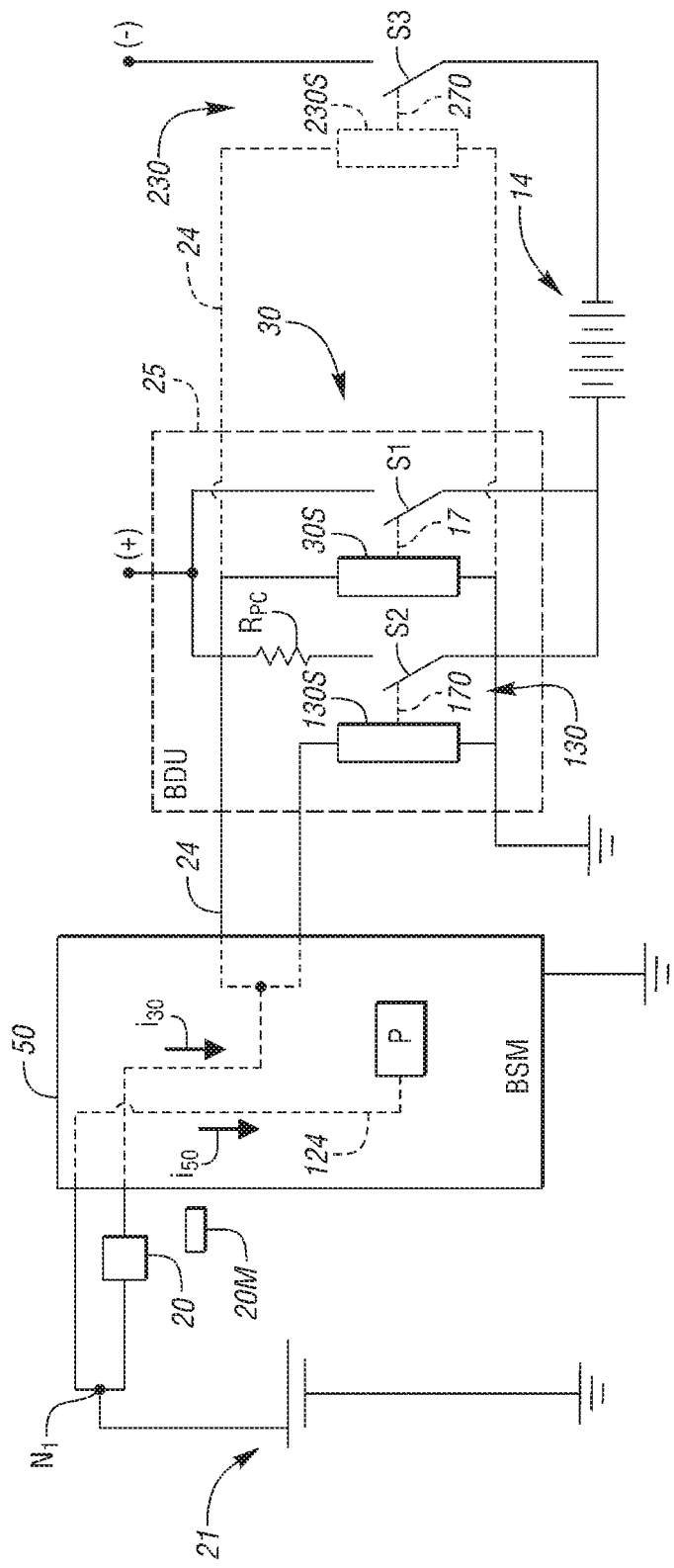
FIG. 2 is a schematic circuit diagram for a portion of the electrical system of FIG. 1.

The RESS 14 of FIG. 1 is connected to the HV bus 13 by a battery disconnect unit (BDU) 25. Referring briefly to FIG. 2, the BDU 25 includes a high-voltage switch device 30, e.g., a solenoid-driven contactor as shown in FIG. 2, a solid-state/semiconductor switch, or other suitable switching device in other embodiments, and may have one or more additional high-voltage switch devices 130 and/or 230 used in conjunction with a pre-charge resistor $R_{PC}$. The example switch devices 30, 130, and 230 are embodied as optional high-current electromagnetic relays configured to close responsive to receipt of the low-voltage drive current (arrows $i_{30}$), possibly in conjunction with a control signal from the controller 50 for added high-voltage lockout security, to electrically connect the RESS 14 to the remainder of the electrical system 10 of FIG. 1.

The low-voltage drive current (arrows $i_{30}$) is conducted via the drive circuit 24, e.g., to corresponding solenoid coils 30S, 130S, and 230S of the respective high-voltage switch devices 30, 130, and 230 in the non-limiting embodiment of FIG. 2. Passage of the drive current (arrows $i_{30}$) through the example solenoid coils 30S, 130S, and 230S in this illustrative embodiment energizes the solenoid coils 30S, 130S, and 230S, as will be appreciated by one of ordinary skill in the art. Mechanical switching elements S1, S2, and S3 having binary open and closed switching states are transitioned to a closed state, e.g., by an electromagnetic field generated about the example solenoid coils 30S, 130S, and 230S when the solenoid coils 30S, 130S, and 230S are energized in this manner.

A corresponding return spring 17, 170, and 270 respectively coupled to the switching elements S1, S2, and S3 allows the switching elements S1, S2, and S3 to quickly spring open when the drive current (arrows $i_{30}$) is cut off and the electromagnetic field of the solenoid coils 30S, 130S, and 230S decays. In this respect, the high-voltage switch devices 30,130, and 230 are normally-open devices. As a result, control signals from a controller are not required to affirmatively command a change the switching state of the switch devices 30, 130, and 230. Rather, the switching states change automatically via field decay when the drive circuit 24 is opened by operation of the electrical connector 20.

In the example embodiment of FIG. 2, the BDU 25 may also include the pre-charge resistor ($R_{PC}$) arranged in series with the switching element S2. An auxiliary battery 21, also shown in FIG. 1 and labeled there as $B_{AUX}$, may be electrically connected to node $N_1$. At node $N_1$, power from the auxiliary battery 21 is split to provide uninterrupted control drive current (arrow $i_{50}$) to a low-voltage controller in the form of a battery system manager (BSM) 50 for powering associated control functions, and to establish a separate current path for passage of the drive current (arrow $i_{30}$) of the high-voltage switch devices 30, 130, and 230 through the drive circuit 24. In the present disclosure, the drive current (arrow $i_{30}$) passes through the electrical connector 20, with the electrical connector 20 constructed to form an electrical switch in the solenoid drive circuit 24 as noted above.

The BSM 50 of FIG. 1 may be embodied as one or more low-voltage powered digital computers each having a processor (P), e.g., a microprocessor or central processing unit, as well as memory M (see FIG. 1) in the form of read only memory, random access memory, electrically-programmable read only memory, etc., a high-speed clock, analog-to-digital and digital-to-analog circuitry, input/output circuitry and devices, and appropriate signal conditioning and buffering circuitry.

Functions of the BSM 50 may vary with the intended application, possibly including battery management system functions, e.g., monitoring and controlling temperature, state of charge, voltage, and other performance characteristics of the RESS 14. As such, an auxiliary voltage feed into the BSM 50 is always maintained regardless of the open/closed state of the switch formed by the electrical connector 20. Use of the split-power approach at node $N_1$ of FIG. 2 is one possible embodiment for ensuring continuity of the above-described control functions of the BSM 50, with the separate power feed to the BSM 50 shown in FIG. 1 as a dedicated voltage bus 124. Other approaches may be used, such as a dedicated connection to a low-voltage output of the high-voltage component 16 when the high-voltage component 16 is configured as a DC-DC power converter or using a dedicated auxiliary power supply.

Referring again to FIG. 1, the electrical system 10 in some embodiments may include a power inverter module (PIM) 28. The PIM 28 may be electrically connected to a polyphase electric machine ($M_E$) 31, e.g., an electric traction motor as shown or an electric generator in other embodiments, via an alternating current ($V_{AC}$) voltage bus 32. The electric machine 31, when energized, outputs motor torque (arrow $T_M$) to an input member 35 of a transmission (T) 36. Output torque (arrow $T_O$) is then transmitted from an output shaft 37 of the transmission 36 to one or more drive axles 40, and ultimately to a set of road wheels 42 in the illustrated embodiment of the vehicle 12.

The PIM 28 includes a bank of IGBTs or other application-suitable semiconductor switches 34, shown collectively and schematically for simplicity. The semiconductor switches 34 have a corresponding on/off (conducting/non-conducting) switching states that may be controlled responsive to switching signals (arrow $CC_O$) from the BSM 50, as will be appreciated by one of ordinary skill in the art. The switching control signals (arrow $CC_O$) may be used for power inversion or conversion as needed.

As residual high-voltage energy may be stored after opening of the high-voltage switch devices 30, 130, and 230 of FIG. 2, e.g., in a capacitor bank (not shown) of the PIM 28 and/or HV component 16, the BSM 50 as an additional control action may be configured to automatically discharge the high-voltage bus 13 of stored energy via transmission of the switching control signals (arrow $CC_O$) to the PIM 28 responsive to opening of high-voltage switch devices 30, 130, and 230. That is, with the RESS 14 disconnected from the high-voltage bus 13, energy captured in such a capacitor bank and other circuit components may be dissipated through the windings of the electric machine 31 via operation of the semiconductor switches 34. Such an approach may require a connection to the processor (P) of the BSM 50 from the solenoid drive circuit 24. Other control actions of the BSM 50 may be initiated in response to control input signals (arrow $CC_I$), including but not limited to ongoing torque or speed control of the electric machine 31 and/or battery manager functions such as state of charge balancing of the RESS 14.

Figure 3:
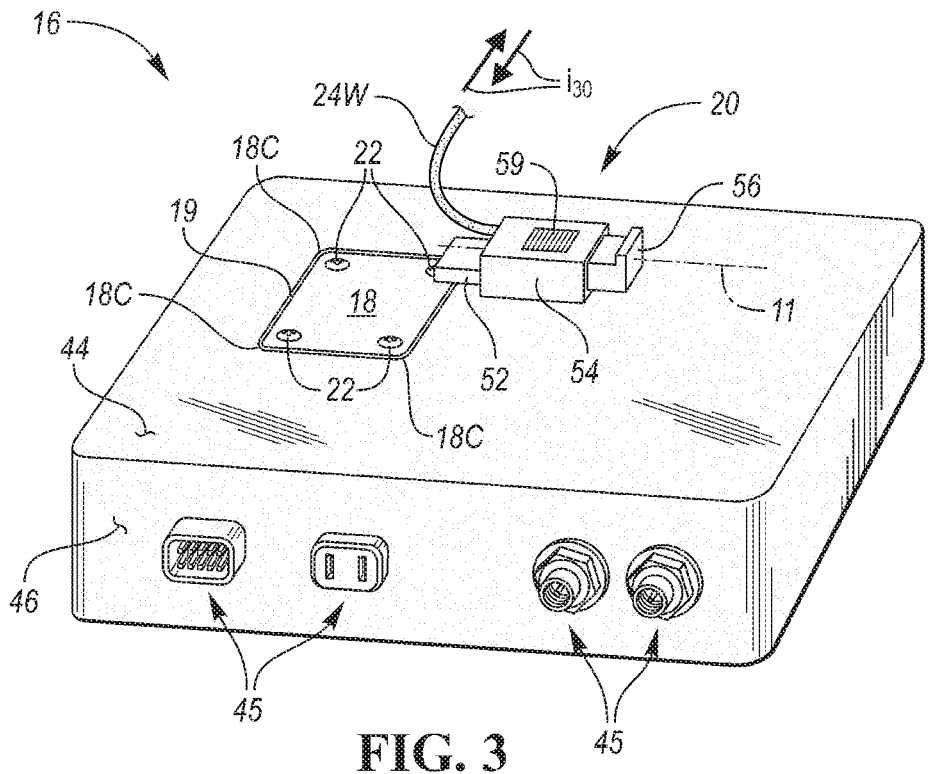
FIG. 3 is a schematic perspective view illustration of an example high-voltage component having a removable cover and a multi-piece electrical connector according to a possible embodiment.

Referring to FIG. 3, the high-voltage component 16, which may be embodied as an auxiliary power module in the form of a DC-DC voltage converter, an air conditioning control module, or other high-voltage component of the electrical system 10 shown in FIG. 1, has a primary surface 44 and side or lateral surfaces 46 having various control ports 45, e.g., additional electrical and/or fluid/coolant ports. Access into the high-voltage component 16 may be periodically required to replace internal fuses and/or to perform other maintenance tasks. To this end, the high-voltage component 16 defines the service opening 19. The opening 19 may be spanned by the removeable cover 18 when the cover 18 is in the illustrated installed position. One or more fasteners 22 securely connect the cover 18 to the high-voltage component 16 when in the installed position. The cover 18 may have a rectangular perimeter as shown, with a respective fastener 22 positioned at each of the corresponding corners 18C of the cover 18.

The electrical connector 20 noted above, which may have a centerline 11 as shown, may receive and support a multi-wire conductor 24W, or optional four-wire conductor (not shown), forming the conductive path of the solenoid drive circuit 24 shown in FIGS. 1 and 2. That is, the drive current (arrows $i_{30}$) flows to and from the high-voltage switch devices 30, 130, and 230 of FIG. 2 through the multi-wire conductor 24W and the electrical connector 20. The electrical connector 20 includes respective first, second, and third connector pieces 54, 56, and 58 in the illustrated example embodiment, with the third connector piece 58 depicted in FIG. 4 and described below. The connector pieces 54, 56, and 58 of the electrical connector 20 collectively form an electrical junction or switch 57 (see FIG. 4) in the low-voltage drive circuit 24 of FIGS. 1 and 2.

Disconnection of the connector pieces 54, 56, and 58 from each other, possibly facilitated by a push-button latch 59, ultimately interrupts the solenoid drive current (arrow $i_{30}$) and causes the high-voltage switch devices 30, 130, and 230 of FIG. 2 to open, i.e., forms an open-circuit condition in the low-voltage drive circuit 24. The connector pieces 54 and 56 may be linearly translatable with respect to each other and connector piece 58, e.g., as a sliding/tongue-and groove or other mated fitting, to easily separate from and to the connector piece 58.

Additionally, the first and second connector pieces 54 and 56 of FIG. 3, when connected or coupled together and attached to the high-voltage component 16, may be configured to physically block access to and thereby prevent removal of one or more of the fasteners 22. Specifically, the connector piece 54 and/or 56 may be integrally formed with or connected to a blocking portion 52 of the electrical connector 20, with the blocking portion 52 possibly constructed as a cantilevered arm or extension of the first connector piece 54. The blocking portion 52 is interposed between one or more of the fastener(s) 22 and an operator attempting to insert a bit of a screwdriver or other tool into a head of the fasteners 22. In this manner, the blocking portion 52 and/or the first or second connector portions 54 or 56 prevents access to the fastener(s) 22. In other embodiments, the blocking portion 52 may overlap some or all surface area of the cover 18, e.g., a perimeter edge defining the outer boundary of the service opening 19, such that removal of the electrical connector 20 is required for removal of the cover 18.

Figure 4:
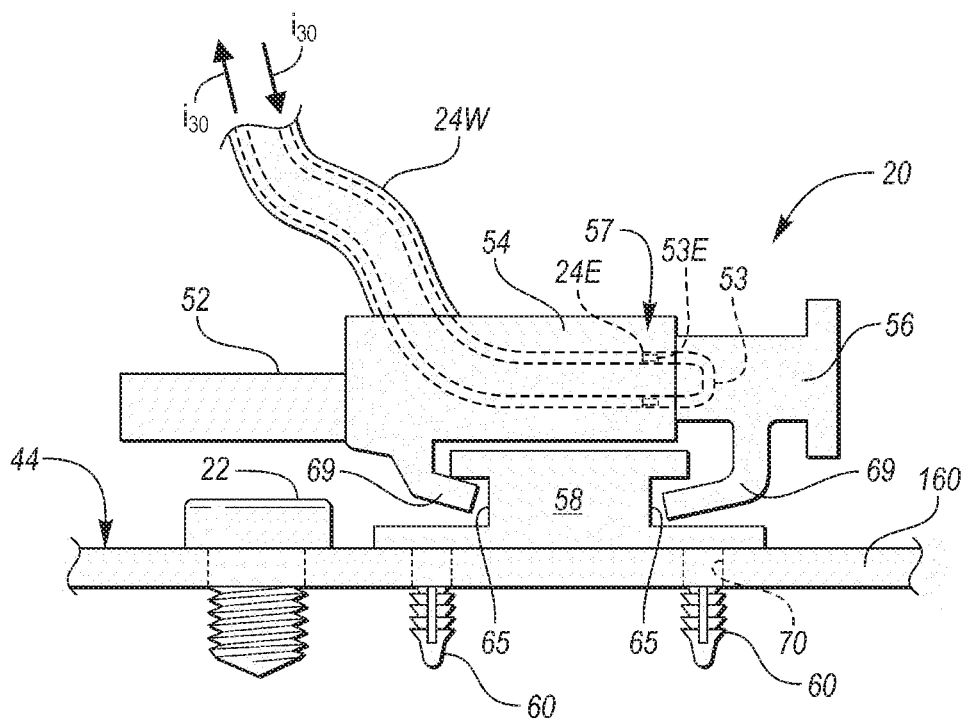
FIG. 4 is a schematic cross-sectional side view illustration of a multi-piece electrical connector usable as an alternative to the embodiment shown FIG. 3.

FIG. 4 depicts another possible embodiment of the electrical connector 20 showing the respective first, second, and third connector pieces 54, 56, and 58. Connector piece 58 in the illustrated embodiment is configured to fixedly engage the high-voltage component 16. Connector pieces 54 and 56 are configured to connect to the connector piece 58, as well as to each other, to close the solenoid drive circuit 24 of FIGS. 1 and 2. Connector piece 58 may have a fastener 60 configured to fixedly engage the high-voltage component 16. In an example embodiment, the fastener 60 may be one or more barbed or ribbed push-in clip fasteners pressed through and penetrating a mating hole 70 in the high-voltage component 16, e.g., in an outer panel 160 of a housing thereof. Projections 69 of the first and second connector pieces 54 and 56 may engage recesses 65 in the third connector piece 58 and thereby clamp onto the third connector piece 58 when the electrical connector 20 is assembled and installed as shown. The projections 69 are configured to fully engage the recesses 65 when the solenoid drive circuit 24 is closed, which may help ensure the HVSL feature remains intact during subsequent HV service events. As a variation, the recesses 65 may be integrated into the surface 44 and/or into panel 160 and another recess 65 may be integrated into the cover 18, with such an embodiment possibly eliminating the need for third connector 58.

The above-noted multi-wire conductor 24W may be used to form the drive circuit 24 shown in FIGS. 2 and 3. The multi-wire conductor 24W may be routed between corresponding high-voltage switch devices 30, 130, and 230, e.g., the solenoids 30S, 130S, and 230S of FIG. 2 and the second and third connector pieces 54 and 56 of the electrical connector 20. Connector pieces 54 and 56 may include a U-shaped shorting bar 53 that closes the drive circuit 24, i.e., closes an open-circuit gap in the multi-wire conductor 24W, when the second and third connector pieces 54 and 56 are connected to each other. For instance, distal ends 24E of the multi-wire conductor 24W may be plugged into mating sockets defined by ends 53E of the U-shaped shorting bar 53 as shown.

As explained in detail above with reference to FIGS. 1-4, disconnection of the first, second, and third connector pieces 54, 56, and 58 from each other ultimately opens the switch 57 to create an open circuit in the low-voltage drive circuit 24. With an open-circuit condition thus established in the drive circuit 24, the drive current (arrow $i_{30}$) can no longer reach the high-voltage switch devices 30, 130, and 230 of FIG. 2. Termination of field generation in the example solenoid-driven application thus causes the high-voltage switch devices 30, 130, and 230 of FIG. 2 to open, which in turn disconnects the RESS 14 of FIG. 1 from the high-voltage component 16. The act of stopping the drive current (arrow $i_{30}$) in the drive circuit 24 can trigger the BSM 50 to automatically discharge the high-voltage bus 13 of stored energy, as noted above.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. An electrical system comprising:
    a high-voltage bus;
    a rechargeable energy storage system (RESS) connected to the high-voltage bus;
    a battery disconnect unit (BDU) having a high-voltage switch device configured to close responsive to a low-voltage drive current to thereby connect the RESS to the high-voltage bus;
    a high-voltage component electrically connected to the HV bus, the high-voltage component having a removable cover and defining a service opening at least partially spanned by the cover when the cover is in an installed position;
    a fastener connecting the cover to the high-voltage component when the cover is in the installed position;
    a low-voltage drive circuit configured to conduct the low-voltage drive current to the high-voltage switch device to thereby energize the high-voltage switch device into a closed state; and
    an electrical connector having multiple connector pieces collectively forming an electrical junction or switch in the low-voltage drive circuit, wherein a disconnection of the multiple connector pieces from each other opens the electrical junction or switch to prevent the low-voltage drive current from reaching the high-voltage switch device, and to thereby cause the high-voltage switch device to transition from the closed state to an open state.

2. The electrical system of claim 1, wherein the electrical connector includes first, second, and third connector pieces as the multiple connector pieces, wherein the third connector piece is configured to fixedly engage the high-voltage component, and the first and second connector pieces are configured to removably connect to each other and to the third connector piece to close the low-voltage drive circuit and also to prevent physical access to and removal of the fastener.

3. The electrical system of claim 2, wherein the high-voltage switch device is a solenoid-driven contactor and the low-voltage drive circuit is routed between a solenoid of the solenoid-driven contactor and the second and third connector pieces.

4. The electrical system of claim 1, wherein the high-voltage bus has a minimum voltage level of 60 volts and the low-voltage drive circuit has a maximum voltage level of 15 volts.

5. The electrical system of claim 1, wherein the cover has a perimeter that is rectangular in shape, and the fastener includes a plurality of fasteners each securing a corresponding corner of the cover, wherein the first and second connector pieces are configured to prevent removal of the fastener by blocking access to at least one of the fasteners.

6. The electrical system of claim 1, wherein the high-voltage component is an auxiliary power module.

7. The electrical system of claim 1, wherein the high-voltage component is an air conditioning control module.

8. The electrical system of claim 1, wherein the third connector piece includes a barbed or ribbed push-in clip fastener that affixes the third connector piece to the high-voltage component.

9. The electrical system of claim 1, wherein the low-voltage drive circuit includes a multi-conductor wire, and the first or second connector piece includes a U-shaped shorting bar that contacts the multi-conductor wire to close the low-voltage drive circuit when the first and second connector pieces are connected to each other.

10. The electrical system of claim 1, further comprising a battery system manager (BSM), a power inverter module, and a polyphase electrical machine connected to the high-voltage bus via the power inverter module;
wherein the BSM is a controller that is configured to automatically discharge the high-voltage bus via transmission of switching control signals to the power inverter module responsive to the high-voltage switch device being opened.

11. An electrical connector for use in an electrical system having a high-voltage component connected to a rechargeable energy storage system (RESS) via a high-voltage bus, and a battery disconnect unit (BDU) having a high-voltage switch device selectively connecting and disconnecting the RESS to and from the high-voltage bus, respectively, the high-voltage switch device being configured to close responsive to a low-voltage drive current to connect the RESS to the high-voltage bus, wherein the high-voltage component defines a service opening and has a cover that at least partially spans the service opening when the cover is in an installed position, the electrical connector comprising first, second, and third connector pieces, wherein:
the third connector piece is configured to fixedly engage the high-voltage component through a surface of the high-voltage component;
the first connector piece is removably connectable to the third connector piece; and
the second connector piece is removably connectable to the first and third connector pieces;
wherein the electrical connector at least partially overlaps the cover when in the installed position, the first, second, and third connector pieces collectively form an electrical junction or switch in the low-voltage drive circuit, and a disconnection of the first, second, and third connector pieces from each other opens the electrical junction or switch to prevent the low-voltage drive circuit from reaching the high-voltage switch device and thereby causing the high-voltage switch device to open.

12. The electrical connector of claim 11, wherein the first and/or second connector piece includes a blocking portion configured to block access to the cover, such that removal of the electrical connector is required to remove the cover from the HV component.

13. The electrical connector of claim 12, wherein the blocking portion is a cantilevered member integrally formed with the first connector piece.

14. The electrical connector of claim 11, wherein the cover is secured to the high-voltage component by a fastener, and wherein the blocking portion overlaps the fastener to thereby block the access to the cover.

15. The electrical connector of claim 11, wherein the third connector piece includes a barbed or ribbed push-in clip fastener that affixes the third connector piece to the high-voltage component.

16. The electrical connector of claim 11, wherein the low-voltage drive circuit includes a multi-conductor wire and the first or second connector pieces includes a U-shaped shorting bar that contacts the multi-conductor wire and closes the low-voltage drive circuit when the first and second connector pieces are connected to each other.

17. The electrical connector of claim 11, wherein the first and second connector pieces are linearly translatable with respect to each other and the third connector piece to separate or connect the first and second connector pieces from or to the third connector piece, respectively.

18. The electrical connector of claim 11, wherein the third connector piece defines a plurality of recesses and the first and second connector pieces include projections, the projections being configured to fully engage the recesses when the low-voltage drive circuit is closed.

* * * * *